(12) United States Patent
Ueda

(10) Patent No.: US 7,624,655 B2
(45) Date of Patent: Dec. 1, 2009

(54) SENSOR DEVICE

(75) Inventor: Takashi Ueda, Osaka (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 11/895,148

(22) Filed: Aug. 23, 2007

(65) Prior Publication Data
US 2009/0051520 A1 Feb. 26, 2009

(30) Foreign Application Priority Data
Aug. 29, 2006 (JP) .............................. 2006-231893

(51) Int. Cl.
*G01D 21/00* (2006.01)
(52) U.S. Cl. .................................... 73/866.5
(58) Field of Classification Search .................. 73/488, 73/514.39, 866.5
See application file for complete search history.

(56) References Cited

U.S. PATENT DOCUMENTS

| | | | | |
|---|---|---|---|---|
| 4,521,731 A | * | 6/1985 | Uyeda et al. ................. 324/174 |
| 5,585,780 A | * | 12/1996 | Sakashita .................... 340/432 |
| 6,023,646 A | | 2/2000 | Kubacsi et al. |
| 6,229,454 B1 | * | 5/2001 | Heikkila et al. ......... 340/870.14 |
| 6,490,507 B1 | * | 12/2002 | Campagnolo .................. 701/1 |
| 7,047,804 B1 | * | 5/2006 | Lawrence ................. 73/170.01 |
| 2002/0175833 A1 | * | 11/2002 | Kauffman .................... 340/941 |
| 2005/0043915 A1 | | 2/2005 | Ueda |

FOREIGN PATENT DOCUMENTS

| | | |
|---|---|---|
| CN | 1590203 A | 3/2005 |
| DE | 20117831 U1 | 1/2002 |
| EP | 0908381 A1 | 4/1999 |
| EP | 1508514 A1 | 2/2005 |
| JP | 2005-067354 A | 3/2005 |

* cited by examiner

*Primary Examiner*—John Fitzgerald
(74) *Attorney, Agent, or Firm*—Olson & Cepuritis, Ltd.

(57) ABSTRACT

A speed sensor fastened to a front fork constituting a bicycle with a cable tie includes a sensor body having a reed switch detecting movement of a front wheel in the bicycle, and a rubber pad tied up on the front fork and rotatably holding the sensor body to vary a distance between the front wheel and the reed switch.

6 Claims, 8 Drawing Sheets

SENSOR DEVICE

BACKGROUND OF THE INVENTION

1. Field of the Invention

The present invention relates to a sensor device, and more particularly, to a sensor device for determining a running speed or the like of a bicycle.

2. Description of the Background Art

Measuring devices for a running speed or the like of a bicycle have conventionally been known.

For example, Japanese Patent Laying-Open No. 2005-067354 discloses a measuring device having a measurement body portion arranged at a portion where a rear wheel and a gear crank of a bicycle are positioned, and a display portion arranged at a position in a field of vision of a rider of the bicycle for displaying predetermined information based on a signal transmitted from the measurement body portion.

The measurement body portion has a first sensor portion for detecting movement of a predetermined part of the gear crank to determine a cadence at which a pedal is moving, a second sensor portion for detecting movement of a predetermined part of the rear wheel to determine a running speed of the bicycle, and a transmitting portion electrically connected to the first and second sensor portions for wirelessly transmitting signals detected by the first and second sensor portions to the display portion.

When a sensor portion for detecting movement of a predetermined part in a bicycle is fixed on a front fork or a chain stay of the bicycle, it is necessary to adjust the distance between the fixed sensor portion and the predetermined part. To facilitate the fixation of the sensor portion and adjustment of the distance, a member rotatably holding the sensor portion is required.

On the other hand, there may be a case where the space for attaching a sensor device to a bicycle does not have sufficient room (for example, when a sensor portion is fixed on a front fork). Accordingly, downsizing of a sensor device for a bicycle is required.

Further, in another respect, it is also required to reduce the number of parts to downsize a sensor device.

SUMMARY OF THE INVENTION

One object of the present invention is to provide a sensor device for a bicycle having a reduced number of parts and a smaller size.

A sensor device in accordance with the present invention is a sensor device fastened to a frame or a front fork constituting a bicycle with a band, including a sensor body having a sensor portion detecting movement of a predetermined part in the bicycle, and a base member tied up on the frame or the front fork and rotatably holding the sensor body to vary a distance between the predetermined part and the sensor portion.

According to the above structure, since the base member tied up on the frame or the front fork rotatably holds the sensor body, there is no need to provide another member between the base member and the sensor body. Consequently, the number of parts for the sensor device can be reduced, and the sensor device can be downsized.

Preferably, in the above sensor device, the base member has a first concave portion rotatably receiving the sensor body, and a second concave portion receiving the frame or the front fork.

According to the above structure, since the sensor body is fitted into the first concave portion, the sensor body can be held by the base member stably. Further, since the frame or the front fork is fitted into the second concave portion, the base member and the sensor body can be fixed on the frame or the front fork more firmly.

Preferably, in the above sensor device, the band is fastened to press the sensor body against the first concave portion.

With this structure, the sensor body can be pressed against the base member simultaneously when the band is fastened. Thereby, the sensor body can be fixed more firmly.

Preferably, in the above sensor device, the second concave portion can be deformed to fit a shape of the frame or the front fork.

With this structure, the sensor body can firmly be fixed on the frame or the front fork with the base member interposed therebetween, regardless of the shape of the frame or the front fork.

In the above sensor device, by way of example, the frame is a chain stay or a down tube of the bicycle.

In one aspect, in the above sensor device, the predetermined part includes a wheel of the bicycle, and the sensor portion detects a running speed of the bicycle based on a number of rotations of the wheel.

Further, in another aspect, in the above sensor device, the predetermined part includes a gear crank of the bicycle, and the sensor portion detects a cadence at which a pedal is moving based on a number of rotations of the gear crank.

Preferably, in the above sensor device, the sensor body has a transmitting portion electrically connected to the sensor portion for transmitting a signal detected by the sensor portion to an outside of the sensor body.

With this structure, a result detected by the sensor portion can be transmitted to the outside of the sensor body, and a rider of the bicycle can check the result detected by the sensor portion while riding the bicycle.

As described above, according to the present invention, a sensor device for a bicycle can be downsized. Further, since the number of parts for the sensor device is reduced, manufacturing cost for the sensor device can also be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
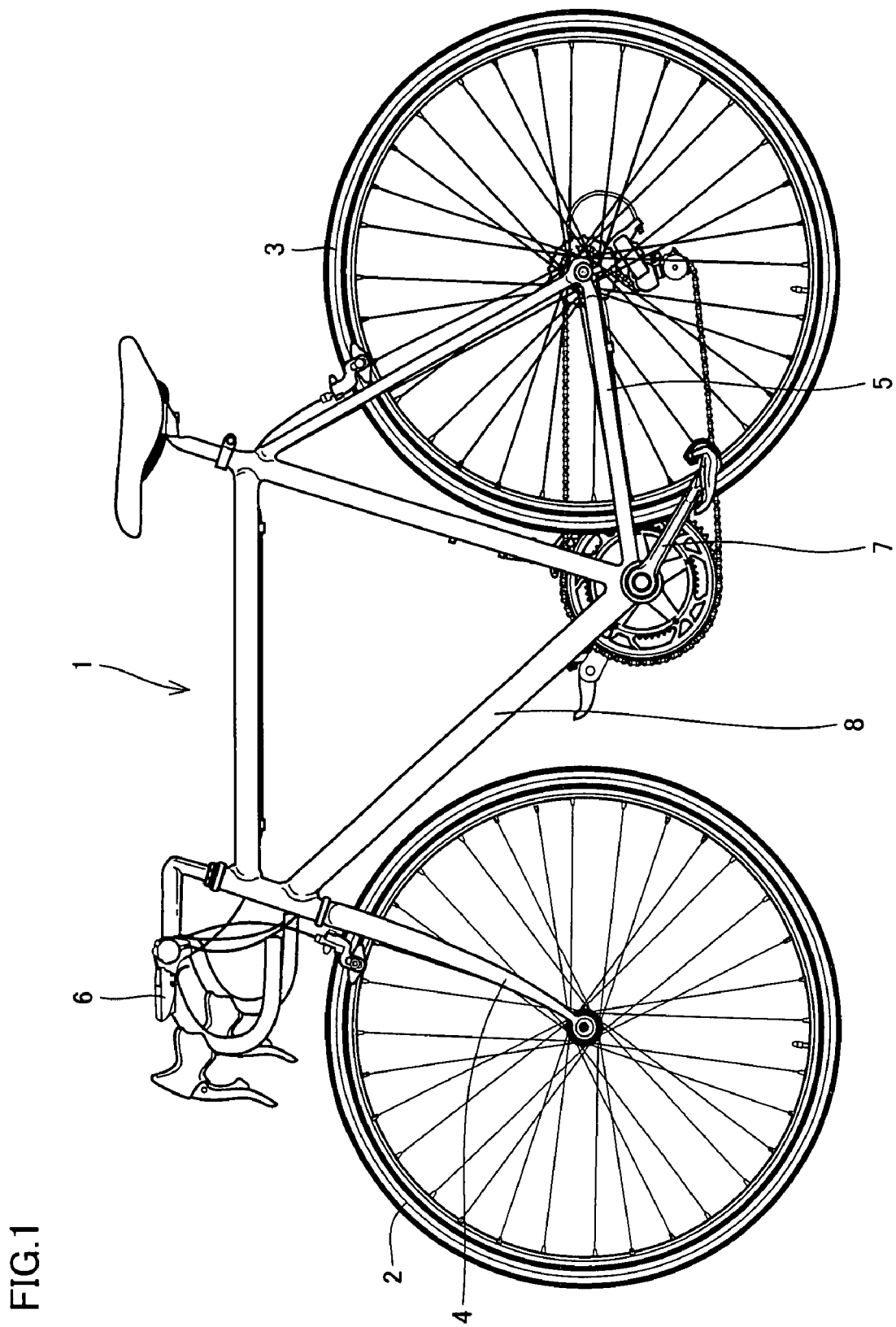
FIG. 1 shows a bicycle to which a sensor device in accordance with one embodiment of the present invention is attached.
Figure 2:
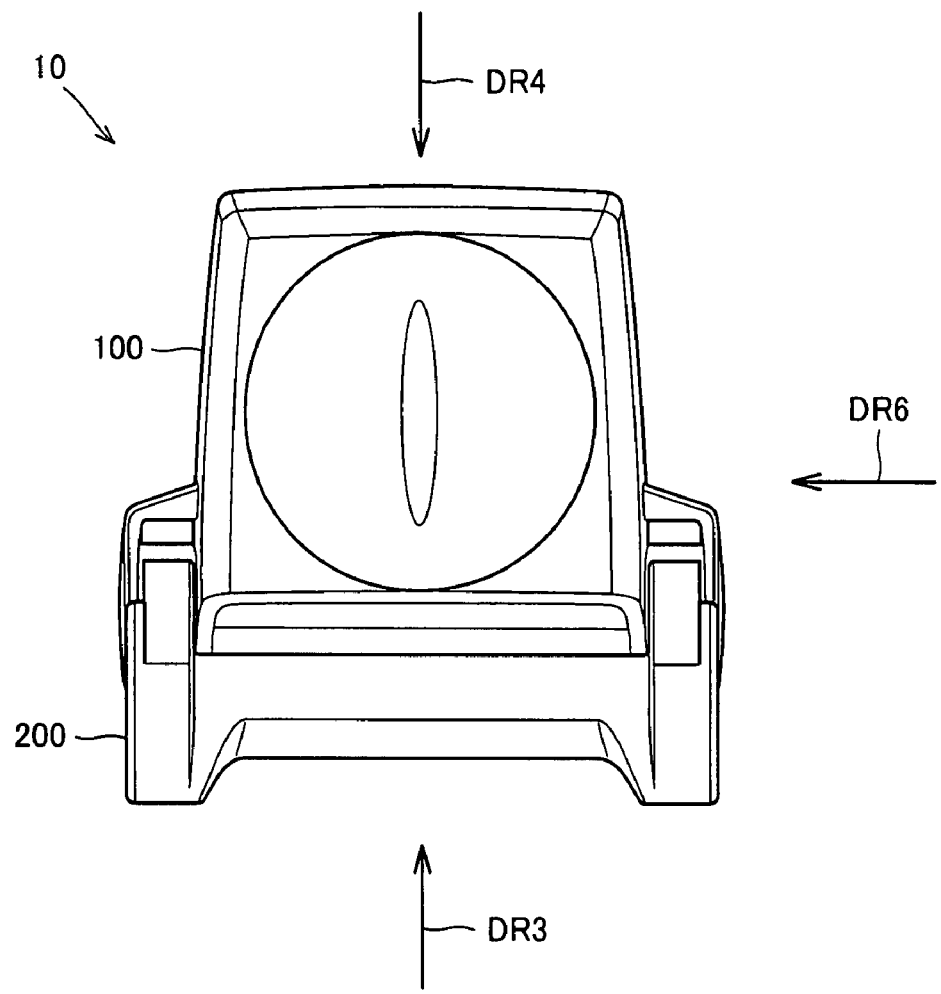
FIG. 2 is a top view showing a sensor device in accordance with one embodiment of the present invention.

Hereinafter, embodiments of the present invention will be described. It is to be noted that identical or corresponding parts will be designated by the same reference numerals, and the description thereof may not be repeated.

When a number, amount, or the like is referred to in the embodiments described below, the scope of the present invention is not necessarily limited to the number, amount, or the like referred to, unless otherwise specified. Further, in the embodiments described below, each component is not necessarily essential to the present invention, unless otherwise specified. Furthermore, when there are a plurality of embodiments below, it is intended from the beginning to combine features of the embodiments as appropriate, unless otherwise specified.

FIG. 1 shows a bicycle to which a sensor device in accordance with one embodiment of the present invention is attached. Referring to FIG. 1, a bicycle 1 includes a front wheel 2, a rear wheel 3, a front fork 4, a chain stay 5, a display portion 6 displaying a result detected by a speed sensor described below, and a gear crank 7 rotating with a pedal.

Figure 3:
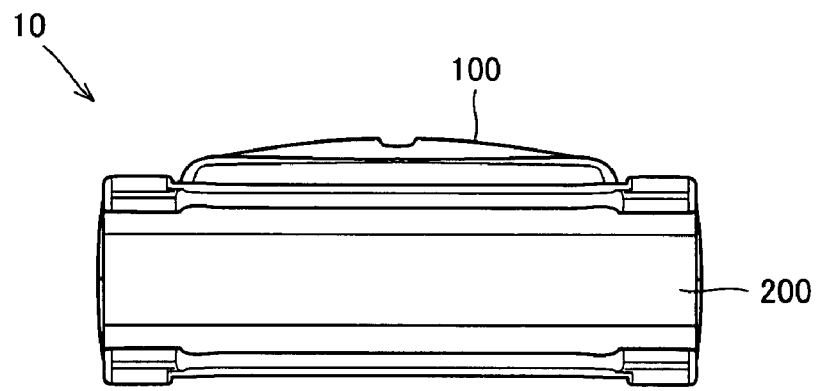
FIG. 3 is a view of the sensor device shown in FIG. 2 seen from a direction indicated by an arrow DR3.
Figure 4:
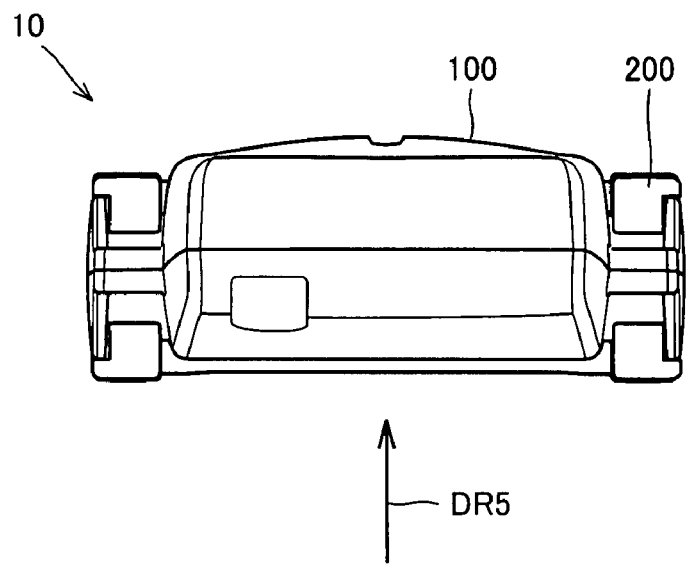
FIG. 4 is a view of the sensor device shown in FIGS. 2 and 3 seen from a direction indicated by an arrow DR4.
Figure 5:
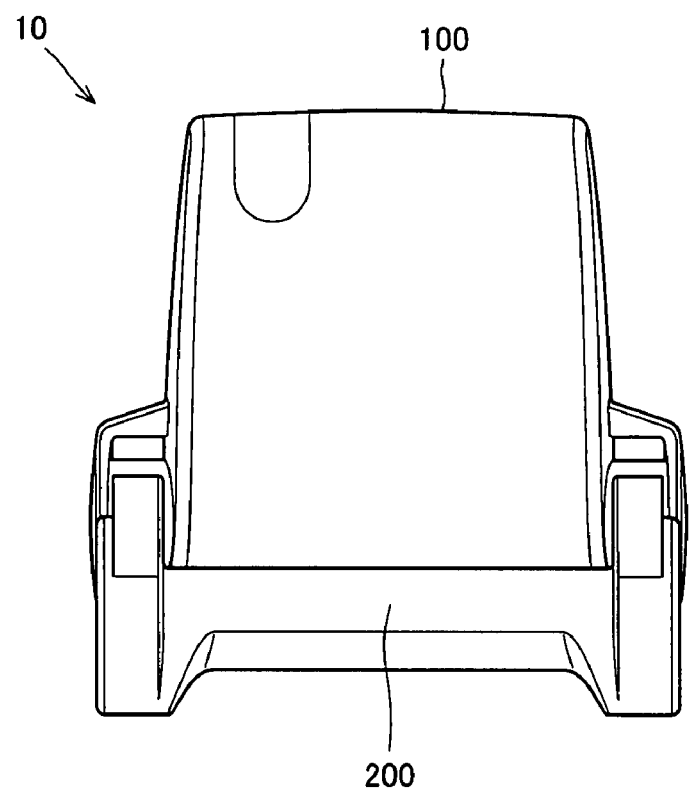
FIG. 5 is a view of the sensor device shown in FIGS. 2 to 4 seen from a direction indicated by an arrow DR5.
Figure 6:
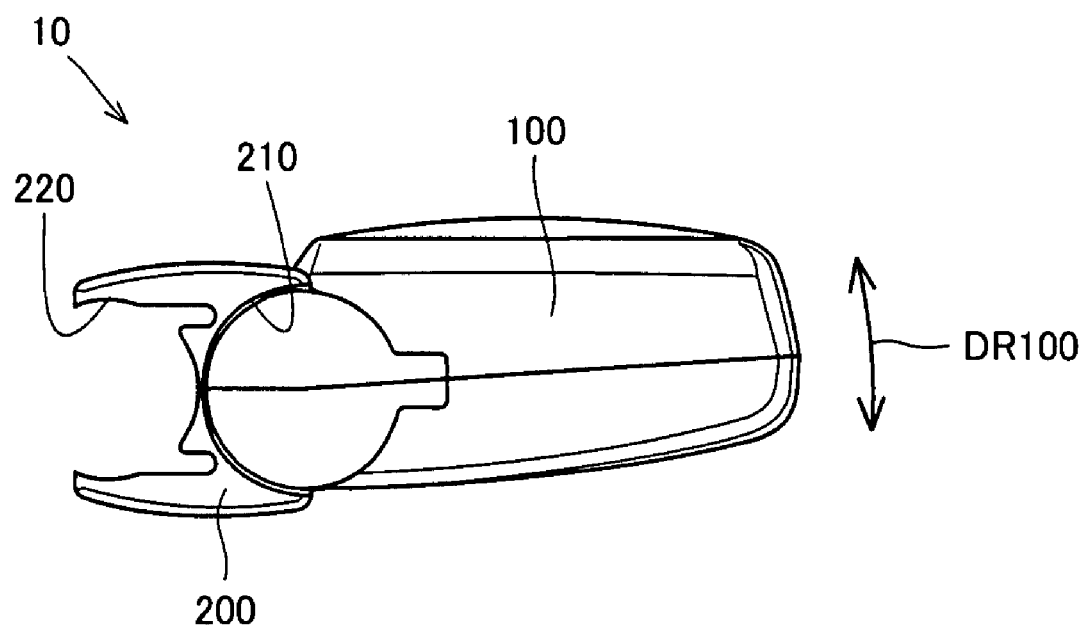
FIG. 6 is a view of the sensor device shown in FIGS. 2 to 5 seen from a direction indicated by an arrow DR6.

FIGS. 2 to 6 are views showing a speed sensor 10 in accordance with the present embodiment. Of them, FIGS. 3, 4, and 6 show speed sensor 10 seen from directions indicated by arrows DR3, DR4, and DR6 in FIG. 2, respectively, and FIG. 5 shows speed sensor 10 seen from a direction indicated by an arrow DR5 in FIG. 4. Speed sensor 10 in accordance with the present embodiment is a device detecting a running speed of bicycle 1 based on the number of rotations of front wheel 2, and includes a sensor body 100 and a rubber pad 200. As shown in FIG. 6, rubber pad 200 has concave portions 210 and 220. Sensor body 100 is fitted into concave portion 210. With being fitted into concave portion 210, sensor body 100 is rotatable in a direction indicated by an arrow DR100. Concave portion 220 receives front fork 4.

Figure 7:
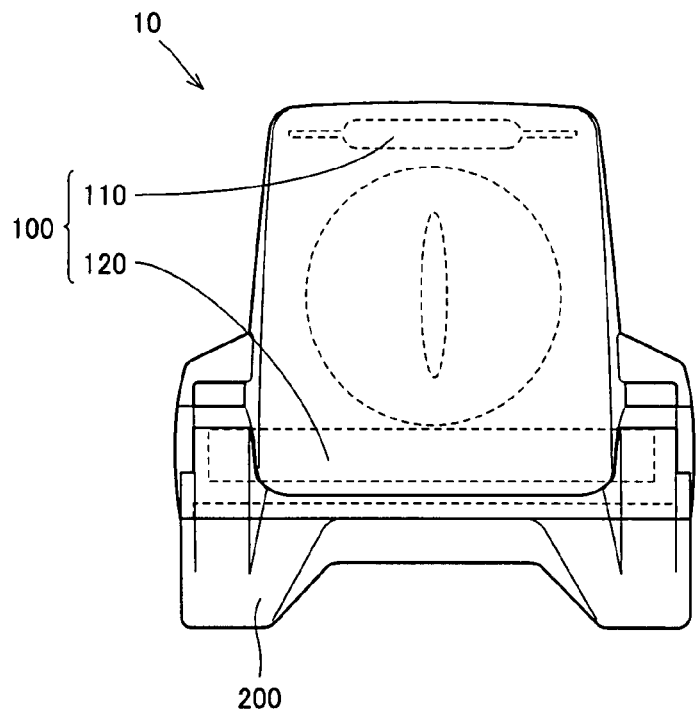
FIG. 7 is a view illustrating an internal structure of the sensor device shown in FIGS. 2 to 6.

An internal structure of sensor body 100 will now be described with reference to FIG. 7. A magnet is attached to a spoke of front wheel 2 shown in FIG. 1. Sensor body 100 has a reed switch 110 detecting passage of the magnet attached to the spoke of front wheel 2, and a transmitting coil 120 (transmitting portion) electrically connected to reed switch 110 for transmitting a signal detected by reed switch 110 to display portion 6. With this structure, the result detected by speed sensor 10 can be transmitted to display portion 6, and a rider of bicycle 1 can check the running speed of bicycle 1 while he is riding bicycle 1.

Figure 8:
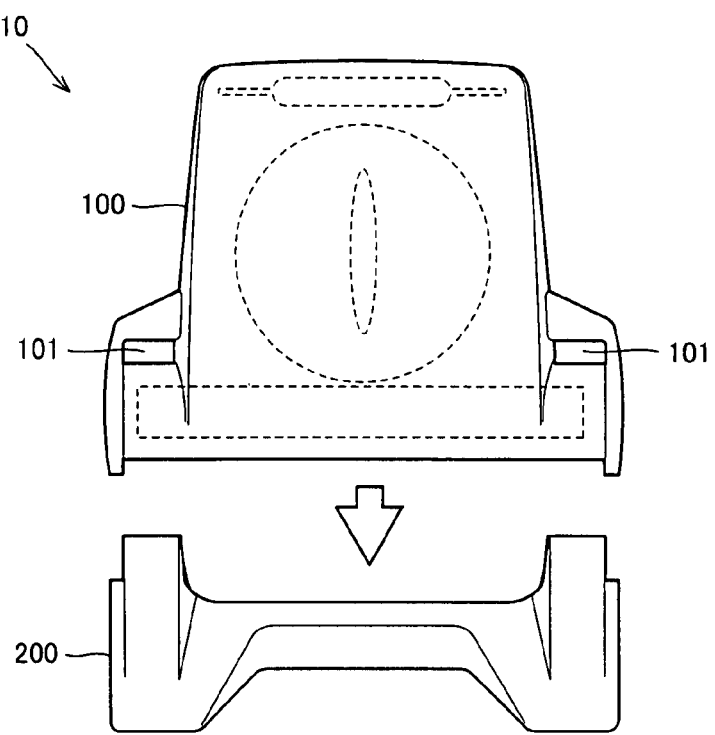
FIG. 8 is a view illustrating an assembly status of the sensor device shown in FIGS. 2 to 7.
Figure 9:
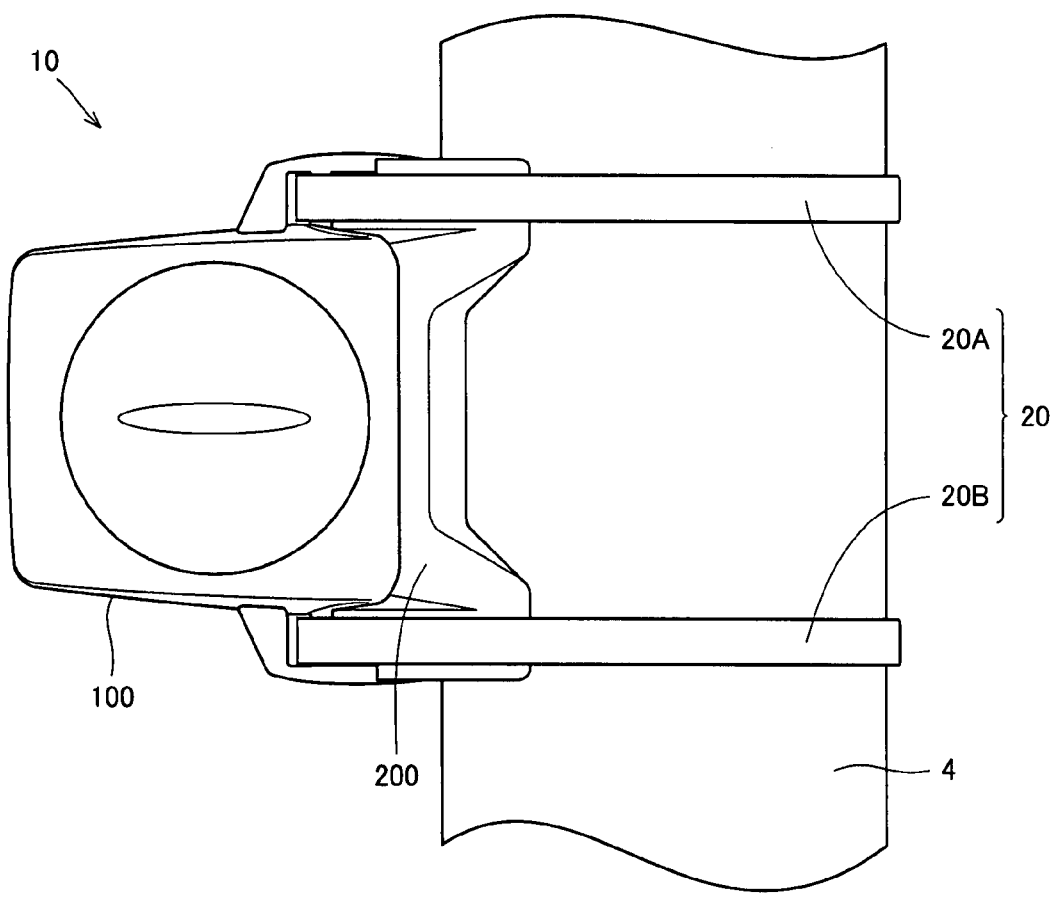
FIG. 9 is a view showing a state where the sensor device shown in FIGS. 2 to 8 is fixed on a front fork of the bicycle.

Next, a description of fixation of sensor body 100 on front fork 4 will be given, using FIGS. 8 and 9. Referring to FIGS. 8 and 9, sensor body 100 is fitted into concave portion 210 of rubber pad 200 from a direction indicated by an arrow in FIG. 8. Then, front fork 4 is fitted into concave portion 220 of rubber pad 200. Thereafter, two cable ties 20 (20A, 20B) such as TYRAP(R) and INSULOK(R) are inserted into two hole portions 101 provided in sensor body 100 to fasten sensor body 100 and rubber pad 200 to front fork 4 with cable ties 20A and 20B. At the same time, sensor body 100 held by rubber pad 200 is rotated in the direction indicated by arrow DR100 (see FIG. 6) to adjust the distance between sensor body 100 and the magnet attached to the spoke of front wheel 2. Through these procedures, sensor body 100 is fixed on front fork 4, and speed sensor 10 is ready for use.

Figure 10:
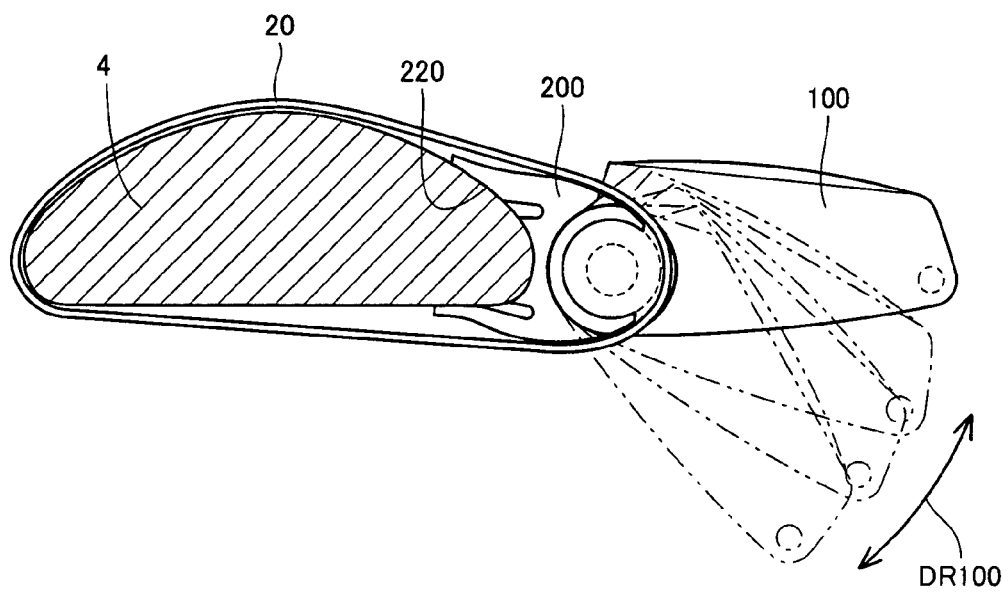
FIGS. 10 to 12 are views illustrating deformed states of a rubber pad in the sensor device fixed on the front fork of the bicycle.
Figure 11:
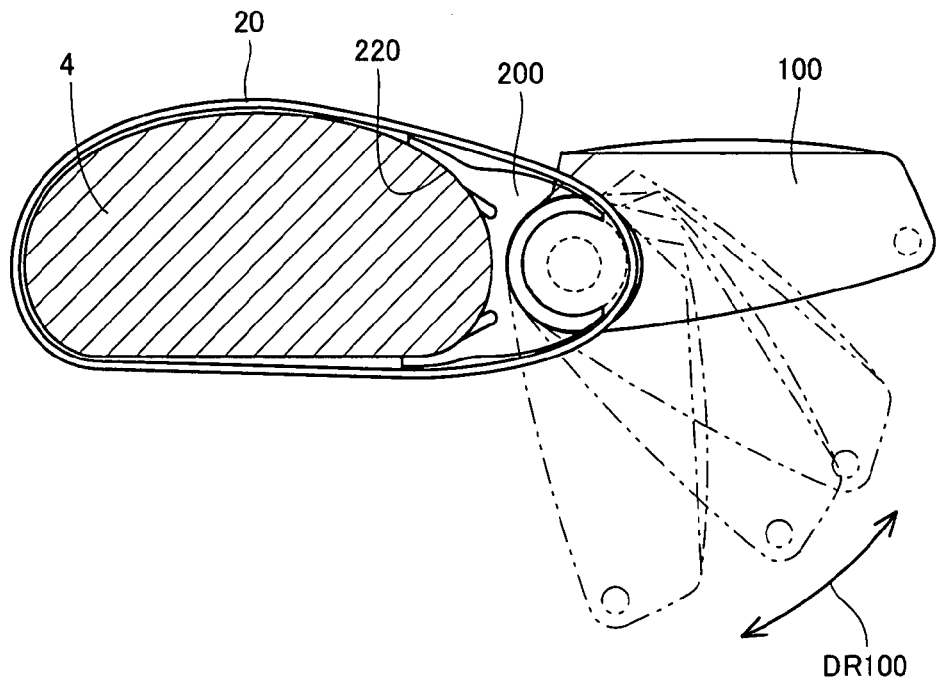
Figure 12:
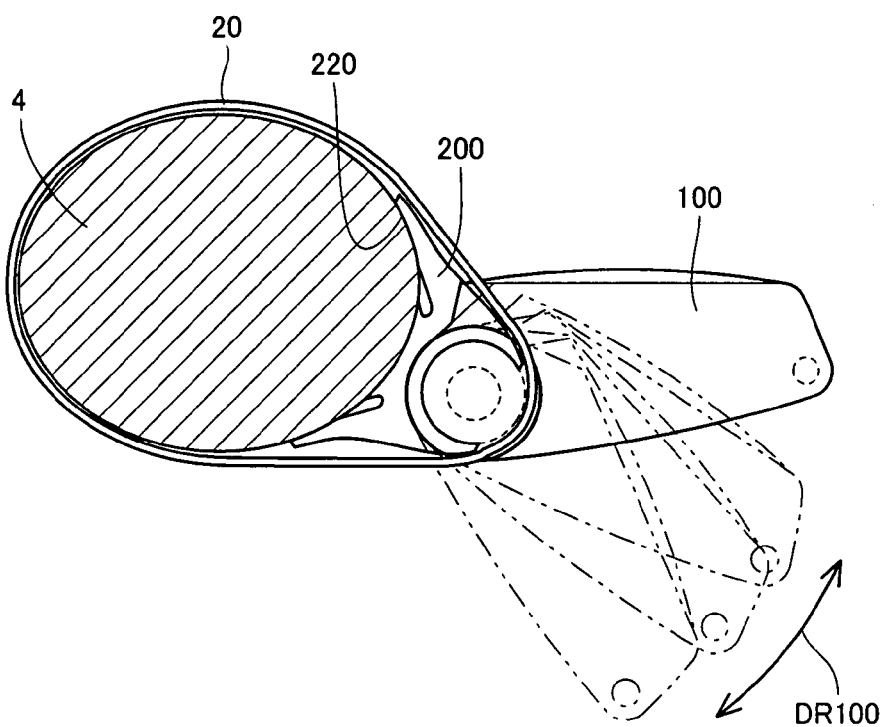

FIGS. 10 to 12 are views illustrating deformed states of rubber pad 200 in the sensor device fixed on front fork 4. As shown in FIGS. 10 to 12, concave portion 220 of rubber pad 200 is deformed to fit the shape of front fork 4. Thereby, in the present embodiment, sensor body 100 can firmly be fixed on front fork 4 having various shapes.

Figure 13:
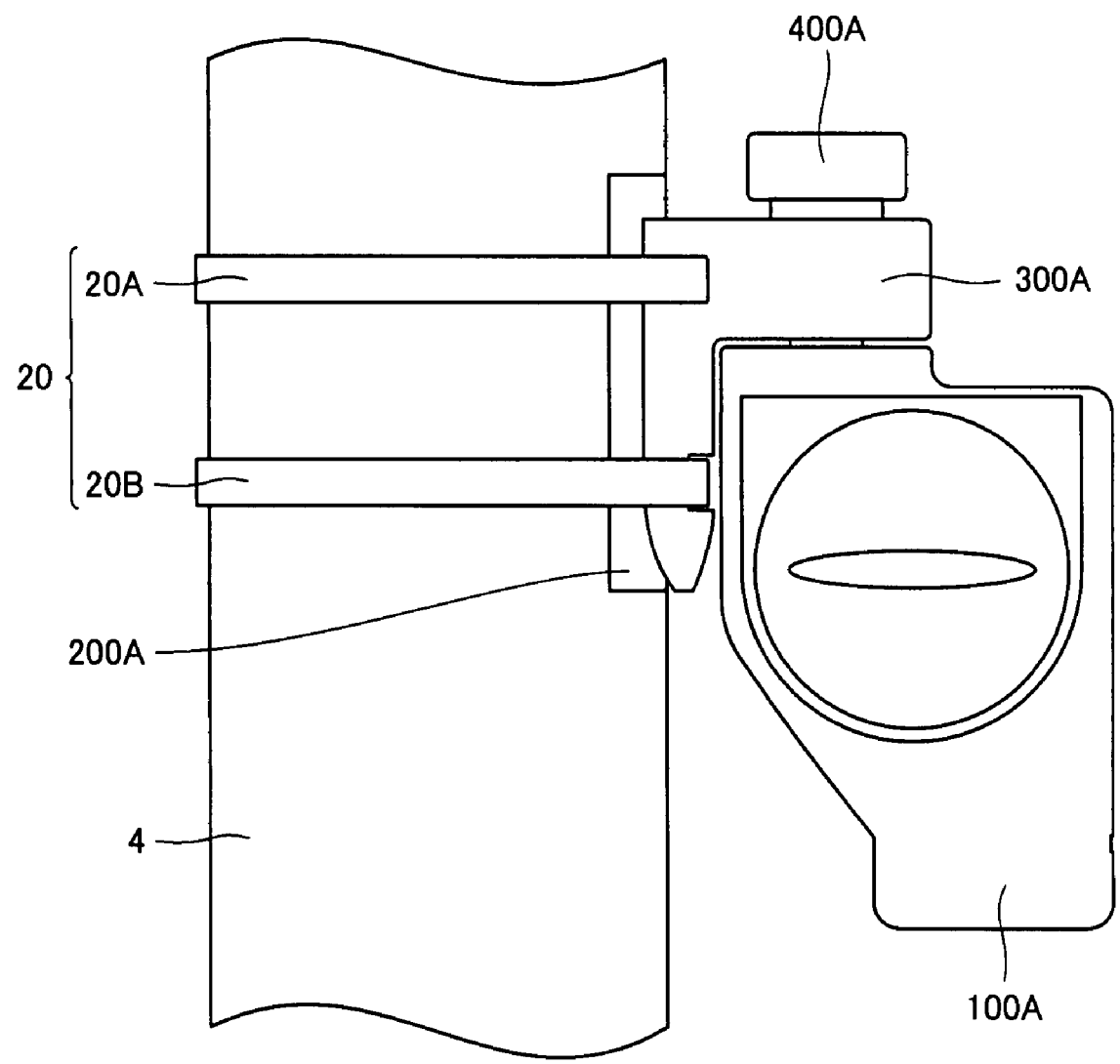
FIG. 13 is a view showing a state where a sensor device in accordance with an example of conventional technique is fixed on the front fork of the bicycle.

FIG. 13 is a view showing a state where a speed sensor in accordance with an example of conventional technique is fixed on front fork 4 of bicycle 1 for comparison with the speed sensor in the present embodiment. In the example of conventional technique shown in FIG. 13, a mount 300A is provided between a sensor body 100A and a rubber pad 200A tied up on front fork 4. An angle adjusting screw 400A for rotating sensor body 100A attached on mount 300A is provided. When the speed sensor in accordance with the example of conventional technique is fixed on front fork 4, firstly, rubber pad 200A and mount 300A holding sensor body 100A are fastened to front fork 4 with cable tie 20 (20A, 20B). Thereby, sensor body 100A is fixed on front fork 4. Thereafter, sensor body 100A is rotated using angle adjusting screw 400A to adjust the distance between sensor body 100A and the magnet attached to the spoke of front wheel 2. Through these procedures, the speed sensor is ready for use.

By use of speed sensor 10 in accordance with the present embodiment, since rubber pad 200 tied up on front fork 4 rotatably holds sensor body 100 as described above, there is no need to provide another member between rubber pad 200 and sensor body 100. Therefore, for example, mount 300A and angle adjusting screw 400A in the example of conventional technique shown in FIG. 13 can be omitted. Consequently, according to speed sensor 10 in accordance with the present embodiment, the number of parts for speed sensor 10 can be reduced, and speed sensor 10 can be downsized.

Further, since sensor body 100 is fitted into concave portion 210, sensor body 100 can be held by rubber pad 200 stably. Furthermore, since front fork 4 is fitted into concave portion 220, rubber pad 200 and sensor body 100 can be fixed on front fork 4 more firmly.

Further, since cable tie 20 is fastened to press sensor body 100 against concave portion 210, sensor body 100 can be pressed against rubber pad 200 simultaneously when cable tie 20 is fastened. Thereby, sensor body 100 can be fixed more firmly.

The above description can be summarized as follows. Speed sensor 10 as a "sensor device" in accordance with the present embodiment is fastened to front fork 4 constituting the bicycle with cable tie 20 as a "band", and includes sensor body 100 having reed switch 110 as a "sensor portion" detecting movement of front wheel 2 as a "predetermined part" of the bicycle, and rubber pad 200 as a "base member" tied up on front fork 4 and rotatably holding sensor body 100 to vary the distance between front wheel 2 and reed switch 110.

More specifically, in speed sensor 10, rubber pad 200 has concave portion 210 as a "first concave portion" rotatably receiving sensor body 100, and concave portion 220 as a "second concave portion" receiving front fork 4.

Although the above description has been given on the example where speed sensor 10 is fixed on front fork 4, speed sensor 10 may be fixed on chain stay 5. In this case, speed sensor 10 detects the running speed of the bicycle based on the number of rotations of rear wheel 3. Further, the "sensor device" is not limited to speed sensor 10, and may be, for example, a sensor detecting a cadence at which a pedal is moving based on the number of rotations of gear crank 7. In this case, the "sensor device" is fixed on chain stay 5 or a down tube 8. Furthermore, the bicycle to which the sensor device in accordance with the present embodiment is attached is not limited to bicycle 1 shown in FIG. 1, and may be, for example, a three-wheeled cycle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensor device fastened to a frame or a front fork constituting a bicycle with a band, comprising:
    a sensor body having a sensor portion detecting movement of a predetermined part in said bicycle; and
    a base member affixed on said frame or said front fork and rotatably holding said sensor body to vary a distance between said predetermined part and said sensor portion and having a first concave portion rotatably receiving said sensor body and a second concave portion receiving said frame or said front fork from a direction opposite to the direction from which said first concave portion receives said sensor body, said band being fastened to press said sensor body against said first concave portion.

2. The sensor device according to claim 1, wherein said second concave portion can be deformed to fit a shape of said frame or said front fork.

3. The sensor device according to claim 1, wherein said frame is a chain stay or a down tube of said bicycle.

4. The sensor device according to claim 1, wherein said predetermined part includes a wheel of said bicycle, and said sensor portion detects a running speed of said bicycle based on a number of rotations of said wheel.

5. The sensor device according to claim 1, wherein said predetermined part includes a gear crank of said bicycle, and said sensor portion detects a cadence at which a pedal is moving based on a number of rotations of said gear crank.

6. The sensor device according to claim 1, wherein said sensor body has a transmitting portion electrically connected to said sensor portion for transmitting a signal detected by said sensor portion to an outside of said sensor body.

* * * * *